United States Patent [19]

Ehmke

[11] 4,181,893
[45] Jan. 1, 1980

[54] BATTERY SAVER FOR A TONE CODED SIGNALLING SYSTEM

[75] Inventor: Edward L. Ehmke, Margate, Fla.

[73] Assignee: Motorola, Inc., Schaumburg, Ill.

[21] Appl. No.: 755,696

[22] Filed: Dec. 30, 1976

Related U.S. Application Data

[63] Continuation of Ser. No. 590,537, Jun. 26, 1975, abandoned.

[51] Int. Cl.² .............................................. H04B 5/04
[52] U.S. Cl. ...................................... 325/492; 325/55; 325/392; 325/64; 328/258
[58] Field of Search ............... 325/492, 151, 185, 186, 325/, 321, 325, 392, 55, 64, 466; 343/228; 340/311, 171 P, 171 F; 328/258

[56] References Cited

U.S. PATENT DOCUMENTS

| | | | |
|---|---|---|---|
| 3,273,069 | 9/1966 | Craig | 325/466 |
| 3,686,635 | 8/1972 | Millington et al. | 325/64 |
| 3,694,755 | 9/1972 | Ward | 325/392 |
| 3,769,593 | 10/1973 | Williams | 325/492 |
| 3,774,114 | 11/1973 | Dahlgren | 325/492 |
| 3,783,384 | 1/1974 | Wycoff | 325/55 |
| 3,835,394 | 9/1974 | Stolt et al. | 325/321 |

FOREIGN PATENT DOCUMENTS 1372821  11/1974  United Kingdom .................... 325/321

*Primary Examiner*—Robert L. Richardson
*Assistant Examiner*—Tommy P. Chin
*Attorney, Agent, or Firm*—James W. Gillman; Donald B. Southard; Phillip H. Melamed

[57] ABSTRACT

A battery saver circuit for a tone coded personalized radio pager device or the like is described which includes a switchable frequency tone filter to detect a predetermined sequence of tones. One of several alert signals is generated when the correct sequential tone code of the device has been detected.

Power is periodically applied to a receiver by a power supply circuit and a control circuit. The first code tone is sampled three times to protect against false identification of this tone. After this first (preamble) tone has been validated, power is supplied for an additional duration of time and the filter is set to detect the next code tone. Once the second code tone has been detected, if the next code tone is not detected within a predetermined time window, the control circuit resets the switchable filter to again search for the second tone of the code. By resetting the filter to detect the second tone, it is possible to condense the broadcast time required for a string of coded messages.

29 Claims, 11 Drawing Figures

| | TYPICAL TIME VALUES |
|---|---|
| 30 | 690 ms |
| 31 | 45 ms |
| 32-1,2,3,4,5 | 33 ms |
| 32-6 | 52 ms |
| 36 | 52 ms |
| 37 | 512 ms |
| 38 | 42.5 ms |
| 39 | 42.5 ms |
| 40 | 1.146 SEC. |
| 41 | 681 ms |

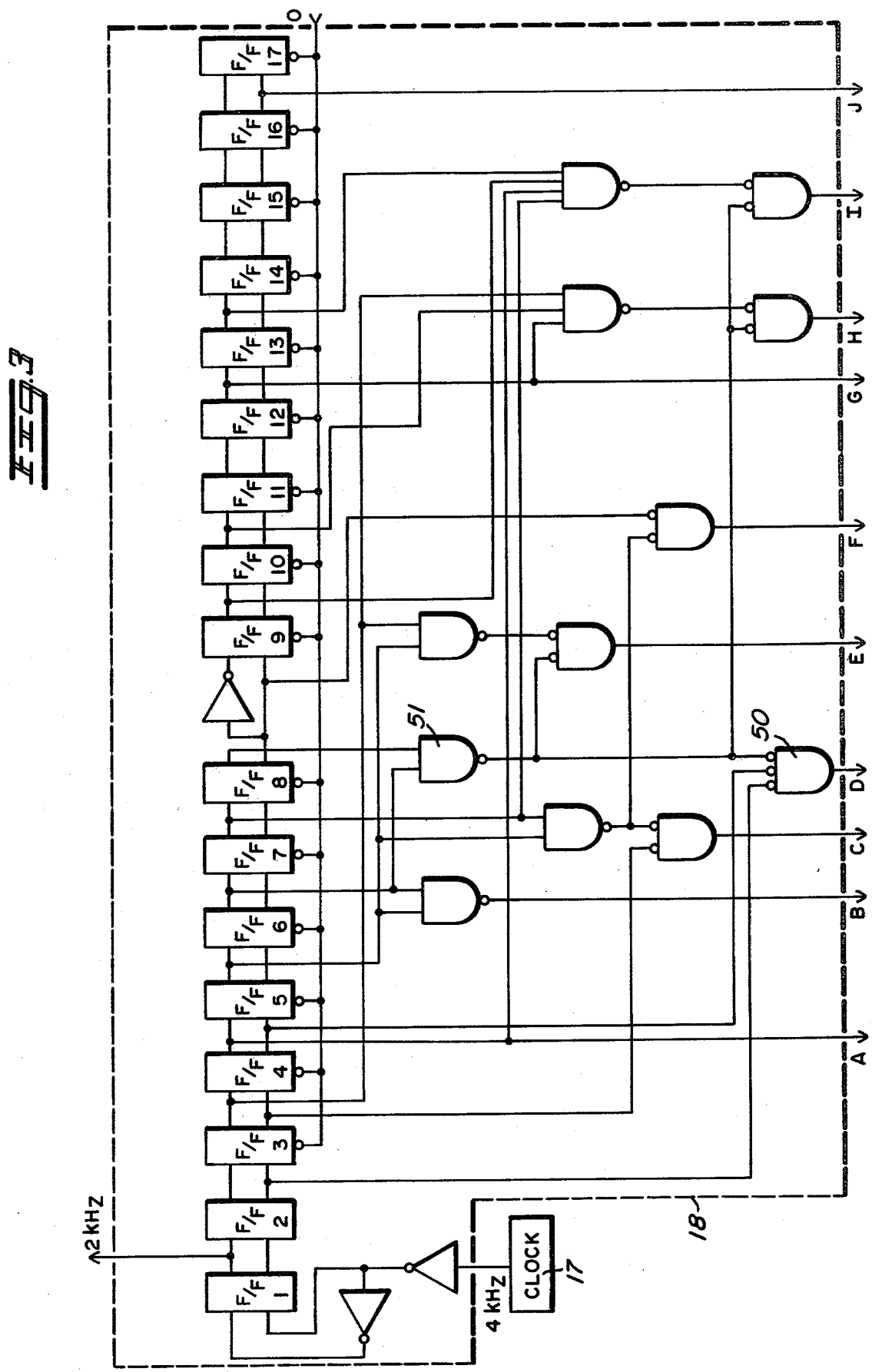

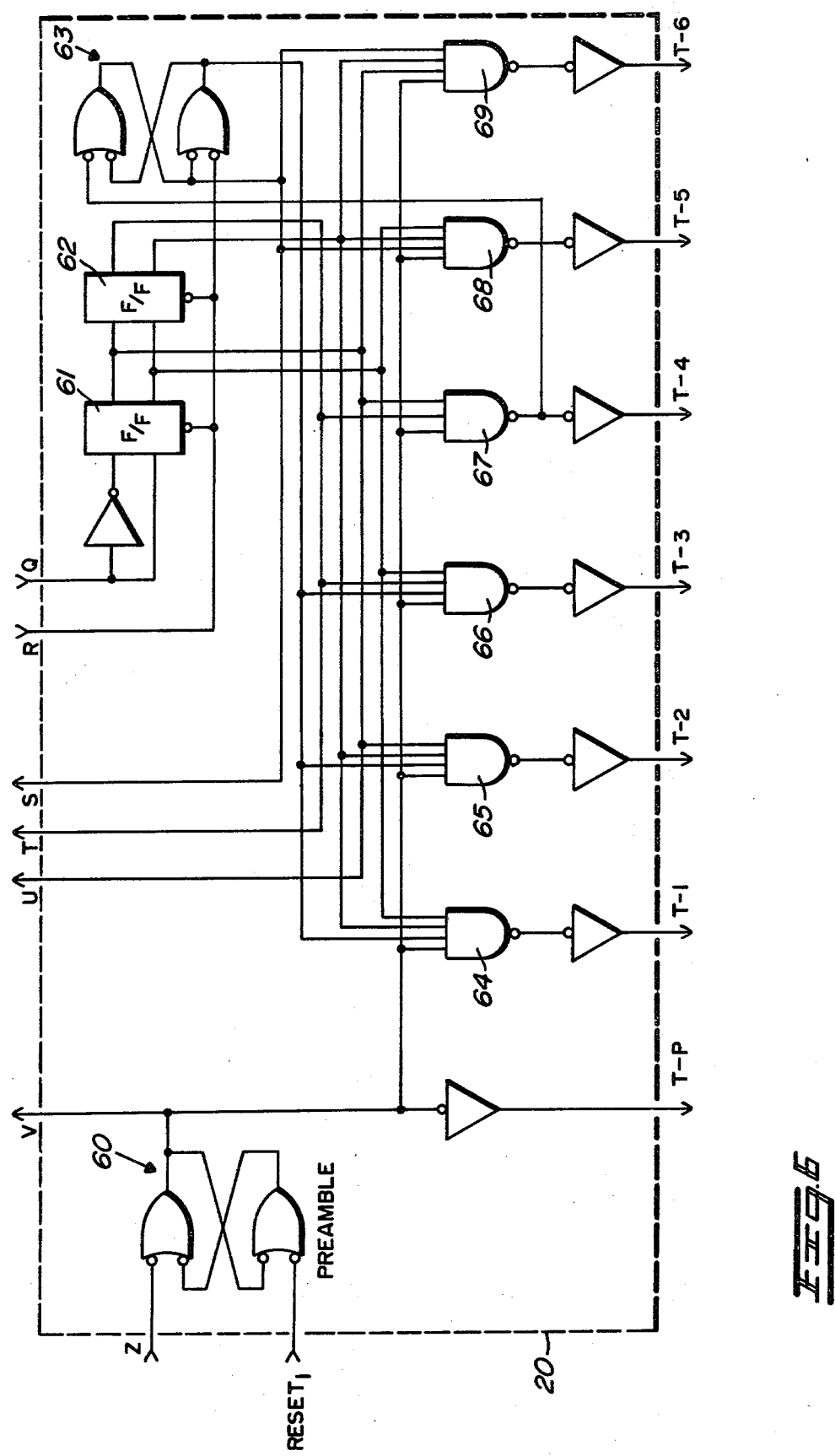

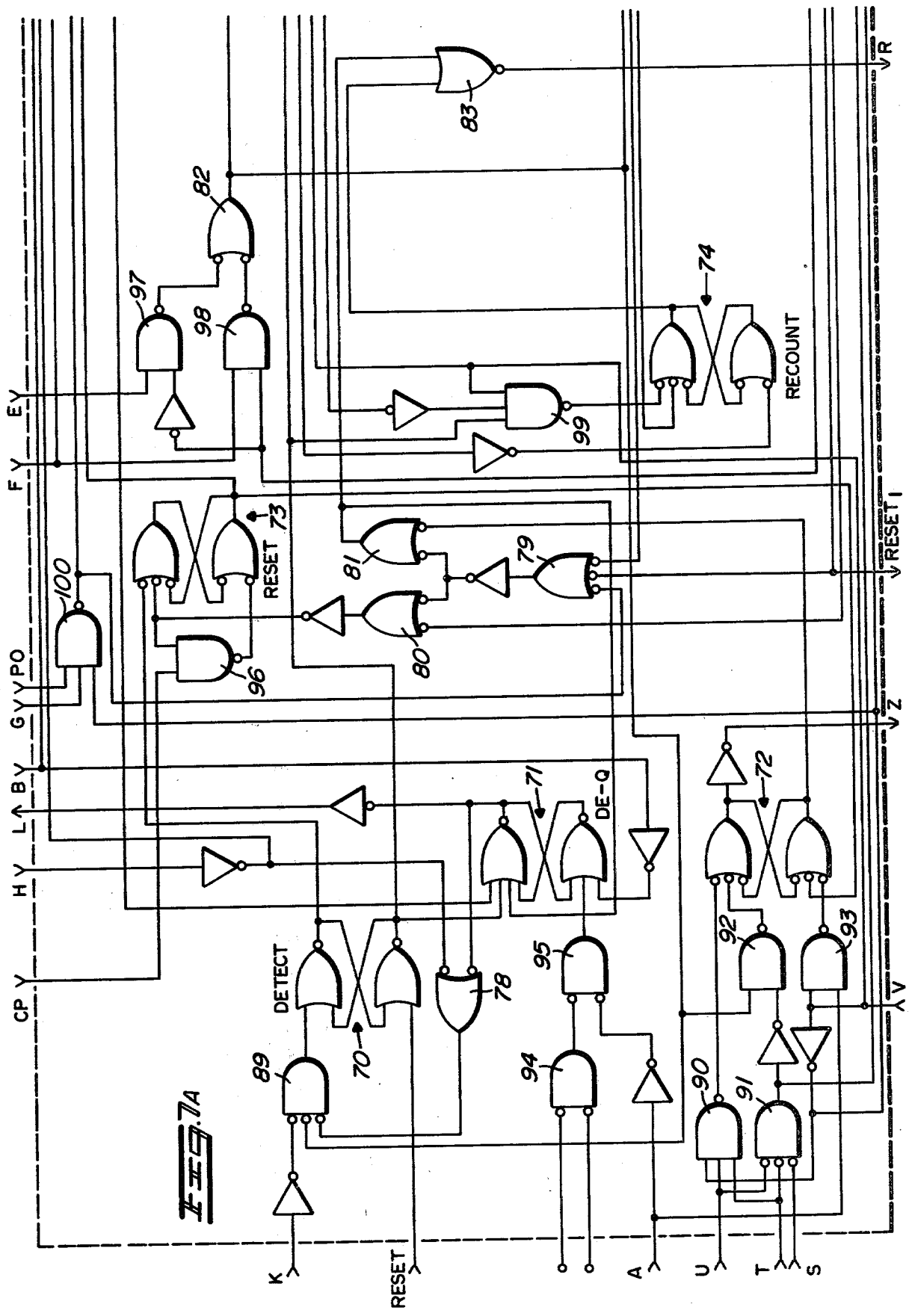

BATTERY SAVER FOR A TONE CODED SIGNALLING SYSTEM

This is a continuation of application Ser. No. 590,537, filed June 26, 1975 now abandoned.

BACKGROUND OF THE INVENTION

The present invention relates generally to battery saver circuits and, in particular, to an improved battery saver circuit especially suited for use in personal paging receivers intended for sequential tone code operation. Such paging receivers produce a single alert signal in response to the reception of a predetermined code.

Battery saving circuits are used to minimize power consumption by periodically supplying power to a receiver in shot bursts instead of continuously. Presently known circuits operating in radio receivers periodically supply power, search for the presence of an RF (radio frequency) carrier and then, if a carrier is found, extend the time that power is supplied to permit a further search for a predetermined sequential tone code. Such squelch operated battery savers have a significant disadvantage in that every receiver within the system is activated whenever any transmission of a carrier occurs, regardless of which individual paging receiver is intended to be selectively reached. If paging signals are continuously being broadcasted by a transmitter, this type of battery saving circuit will not save any power since all of the individual receivers will be on all of the time.

A previous partial solution has been to provide battery saving circuits which extend the time that power is applied to the receiver only after a first predetermined tone has been received. In this type of circuit, the first tone (preamble) must be of a sufficiently long duration such that the periodic supplying of power to the receiver will always result in a detection of this first tone, regardless of when this first tone begins. These circuits then proceed to look for the rest of a predetermined sequential code. Whenever the next proper sequential tone is not detected, the preamble tone is again searched for. A disadvantage of such a system, however, is that each individual message must be preceded by the preamble tone which is the first tone in each sequential code. When many messages are to be transmitted, this results in a substantial increase in the total amount of broadcast time. Consequently, the power drain on all receivers having the same first code (preamble) tone is increased and the total number of messages which can be broadcasted in any given time interval is severely limited. It is also possible for such prior battery saver circuits to mistakenly identify a subsequent tone as the first (preamble) tone of the code, and thus incorrectly apply power to a radio receiver.

SUMMARY OF THE INVENTION

Accordingly, one object of the present invention is to provide an improved battery saver circuit which overcomes the aforementioned deficiencies.

A more particular object of the invention is to provide an improved battery saver circuit for a tone coded receiver in which subsequent tones cannot be mistaken for the preamble or first code tone.

Another object of the invention is to provide an improved battery saver circuit for a receiver which receives a series of several individual tone coded messages collectively preceded by a single tone coded preamble.

Still another object of the invention is to provide a multiple alert receiver which selects and generates one of several alert signals in response to the reception of a predetermined code and an additional signal.

The present invention contemplates an improved battery saver circuit for use with a personalized radio pager operble on receipt of a predetermined sequential tone code comprising a plurality of separate tones. The receiver produces corresponding demodulated tone signals at an output reference terminal. A power supply apparatus is coupled to the receiver for selectively supplying power thereto for predetermined durations of time in response to signals from a control circuit. A switchable frequency detector is coupled to the receiver output terminal for detecting when the demodulated tone signals have a predetermined frequency which is selected by "select" signals that are likewise produced by the same control circuit. The control circuit periodically enables the power supply apparatus to supply the receiver with power for a first predetermined time duration and also causes the detector to select a first frequency which corresponds to the first tone of the sequential code. When the first tone is detected during one of these first time durations, the control circuit enables the power apparatus to supply power for a second predetermined time duration and also causes a second frequency to be selected which corresponds to the second tone of the sequential code. When the second tone is properly detected, the control circuit causes power to be supplied for a third time duration and selects the third tone of the code. When this third tone is not detected within a predetermined time window after the second tone is detected, the control circuit then reselects the second code tone.

Accordingly, the battery saver sequentially searches for a first, second, and third tone of a predetermined code. If the first two tones are properly detected but the third tone is not properly detected, the battery saver will then search again for the second tone. By searching for the second tone when a third proper detection is not made, rather than searching for the first tone, a string of individual messages proceeded by a single preamble tone can be used to signal a number of different paging receivers each having the same first tone (preamble) as the first tone of its code.

Another aspect of the invention is that the first code tone must be detected several times before the second code tone is searched for. This insures that the first code tone must exist for at least a minimum period of time. When this minimum period of time is greater than the time period of any subsequent code tone, a subsequent tone cannot be identified as the initial preamble tone. Also by searching for a first tone rather than a carrier signal, only receivers having this first tone as part of their sequential code will have battery power applied to their receivers and switchable filters for an extended duration.

Still another aspect of the invention is that one of several alert signals is selected and generated in response to an additional signal being received after the entire predetermined code has been detected.

BRIEF DESCRIPTION OF THE DRAWINGS

For a more complete understanding of the invention reference should be made to the drawings, in which:

FIG. 3 is a schematic diagram of one of the component blocks illustrated in FIG. 1A;

FIG. 6 is another schematic diagram of another one of the component blocks illustrated in FIG. 1A.

DESCRIPTION OF THE PREFERRED EMBODIMENT

Figure 1:
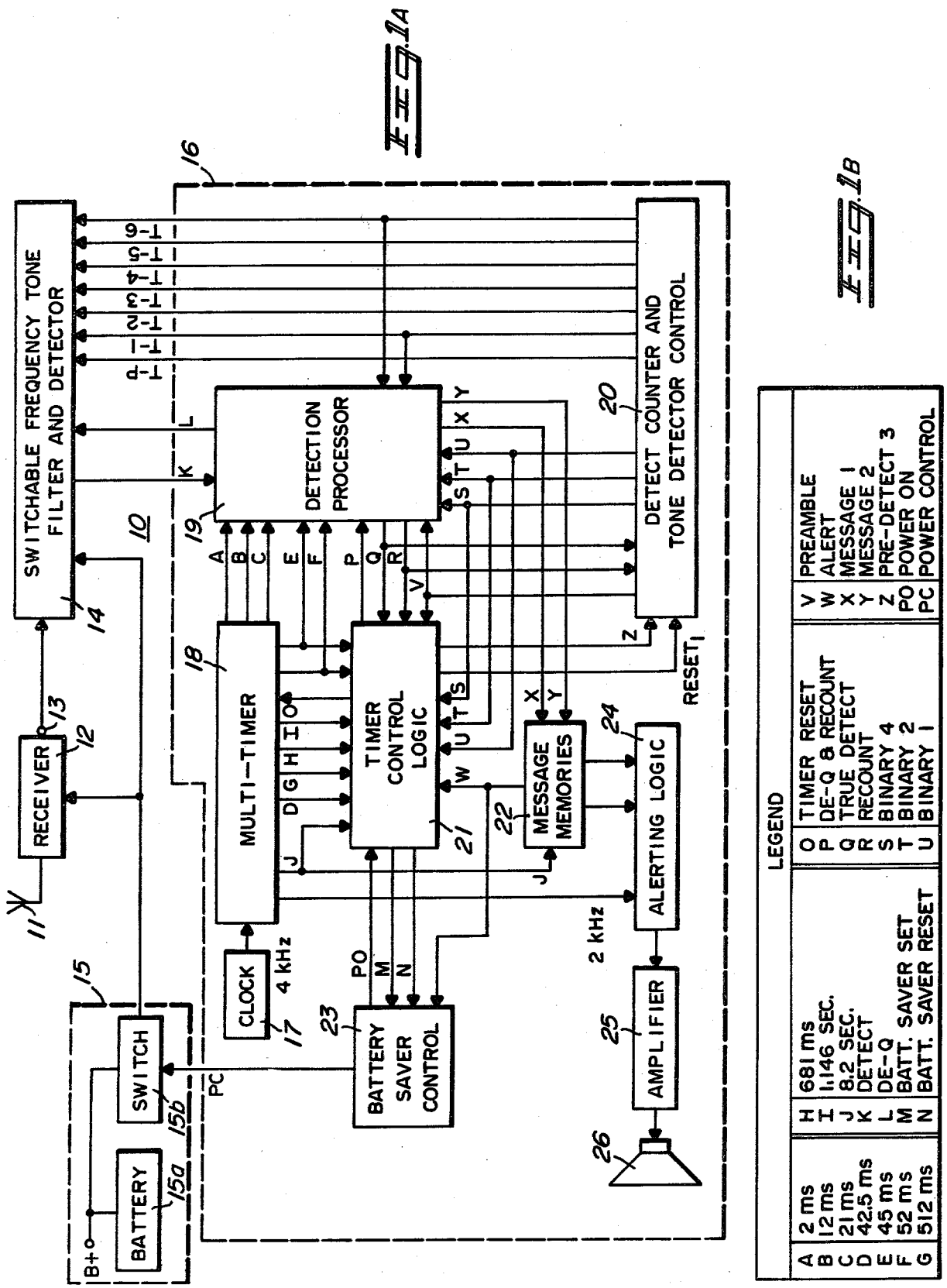
FIG. 1A is a block diagram of a battery saving circuit for a personal radio pager.
FIG. 1B is a chart labeling some of the interconnecting lines illustrated in FIG. 1A.

Referring now to the drawings, a block diagram of a battery saver circuit 10 is shown generally in FIG. 1A. This circuit has been constructed in accordance with the present invention and is particularly adapted for use in a personal radio pager. The circuit 10 includes an antenna 11 coupled to a conventional radio receiver apparatus 12 which includes a modulation output reference terminal, indicated at 13. This terminal is coupled to a switchable frequency tone filter and detector 14. A power supply apparatus 15 (shown dashed) is coupled to receiver apparatus 12 and to filter 14 and supplies operating power thereto. A control circuit 16 (shown dashed) is coupled to the filter 14 and to the power supply 15 for the selective control thereof as will be more fully described subsequently.

The supply circuit 15 includes a source of power, such as battery 15a. The battery is connected to a semiconductor switch 15b which receives control signals from control circuit 16 on an interconnecting line PC. The power supply 15 supplies operating power for rendering receiver apparatus 12 and filter 14 operative in response to the signals received on the referenced line PC. Semiconductor switch 15b functions as a solid state relay and couples the battery 15a to the receiver 12 and filter 14 in response to the control signals on line PC. The receiver apparatus 12, when rendered operative, receives tone modulated input signals from antenna 11 and produces output tone signals, corresponding to the transmitted modulation tones, at output terminal 13.

The filter and detector apparatus 14 receives the demodulated tone signals present at terminal 13 and produces a detect signal in response thereto when these signals have a selected predetermined frequency. This predetermined frequency is determined by "select" signals which are received from control circuit 16 on interconnecting lines T-P through T-6, and the detect signal is coupled to the control circuit on line K. As may be appreciated, the control circuit 16 generates the power control signals for the power circuit 15 and the referenced frequency "select" signals for filter 14 in response to the detect signals received on line K.

The control circuit 16 includes a clock 17 for producing appropriate timing pulses, preferably at a fixed frequency of 4kHz, which are in turn coupled to a multitimer stage 18. The multi-timer comprises a digital down counter (not specifically shown) which counts the generated clock pulses and produces timing pulses on lines A through J which occur at fixed times after the counter has been reset by a signal received on line O. The control circuit 16 also includes a detection processor circuit 19, a detect counter and tone detector control circuit 20, a timer control logic circuit 21, a message memory circuit 22, a battery saver control circuit 23, an alerting logic circuit 24, and an amplifier 25 driving a loud speaker 26, all interconnected substantially as shown in FIG. 1A.

Various parts of the stages 17 through 23 of control circuit 16 periodically generate a control signal on line PC for supplying the receiver apparatus 12 with power for a first predetermined duration of time. Further, a select signal is also generated on lines T-P through T-6, so that filter 14 will produce a detect signal on line K when the output tone signals at terminal 13 have a first predetermined frequency.

After a first detect signal is produced, the control signal on line PC then extends the time that power is supplied to receiver 12 and filter 14. Additionally, the detector portion of filter 14 is reset by a signal received from control circuit 16 on line L and the output of terminal 13 is again sampled by filter 14. If a second detect signal is then produced, the foregoing process is repeated. Once a third detect signal is produced, the control circuit 16 recognizes that a preamble tone which exists for at least a predetermined minimum time duration has been detected and, in that event, produces a power control signal which will keep the receiver on to search for the rest of a predetermined sequential code. Circuit 16 also sets the switchable filter 14 to detect the second tone in the predetermined sequential code. These general system functions can be more easily understood when viewed in conjunction with the wave forms shown in FIGS. 2A–C.

Referring to FIG. 2A, a sequence of individual tones is represented by a series of pulses having the same amplitude but existing for different durations of time. A long preamble tone 30 is followed by a gap 31, three individual messages 32, 33, and 34, and a final nth message 35. Each individual message consists of five sequential tones of identical durations followed by either a gap or a sixth unique tone having a slightly longer duration. Thus FIG. 2A represents a graphical plot of the modulation tones that would be used to signal a group of individually coded receivers. For a receiver to be alerted, a complete sequential code must be identified as exactly corresponding to the sequential code of the individual receiver. A typical sequential code would consist of a first long, or preamble, tone 30 followed by five sequential shorter tones, such as, for example, tones 33-1 through 33-5. Accordingly, the wave form depicted in FIG. 2A would alert four different individual radio receivers. Even more radio receivers would be alerted if additional messages are included between messages 34 and 35.

In FIG. 2B, a pulse 36 having a time period 37 is illustrated and represents the time duration in which power is periodically supplied to the receiver 12 in FIG. 1A. During this time period, the receiver 12 is rendered operative and is permitted to search for the initial tone of its predetermined sequential code. The time period 37 is chosen to be less than the duration of the preamble tone 30 so that the repetitive pulse 36 must occur within the duration of tone 30.

In FIG. 2C, a graph is set forth to illustrate the power applied to receiver 12 as a function of the sequential detection of the predetermined code tones. The power supplied is shown as a series of pulses. The pulses are illustrated as having different amplitudes merely in the interest of clarity and not as an intended limitation. At a time $t_1$, during the time duration of pulse 36, a valid preamble tone may be assumed to be detected by the battery saving circuit 10. The control circuit 16 then terminates the pulse 36, creates a power supply pulse 38, and maintains filter 14 in a condition to again detect the preamble tone 30. When a second valid preamble detection occurs at a time $t_2$ within the duration of pulse 38, a pulse 39 (shown dashed) is created by control circuit 16 and the filter 14 is kept set to detect the preamble tone. When a third valid preamble detection occurs within pulse 39 at a time $t_3$, the control circuit 16 supplies power to the receiver 12 for a long duration of time (an initial time period) represented by a pulse 40, and the tone filter 14 is then set to detect the second tone in the receiver code which corresponds to the first tone in one of the messages following the preamble tone, such as 32-1. The pulse 40 has a duration sufficiently long enough to keep the receiver operative throughout the reception of at least the first tone of two messages following the preamble tone. Upon the identification of a valid second code tone (first message tone) at a time $t_4$, power is supplied to the receiver 12 for a duration of time (a maintenance time period) represented by a pulse 41 (shown dashed). The pulse 41 is shown having a duration sufficient to keep the receiver power on for at least the first tone of two subsequent messages.

Figure 2:
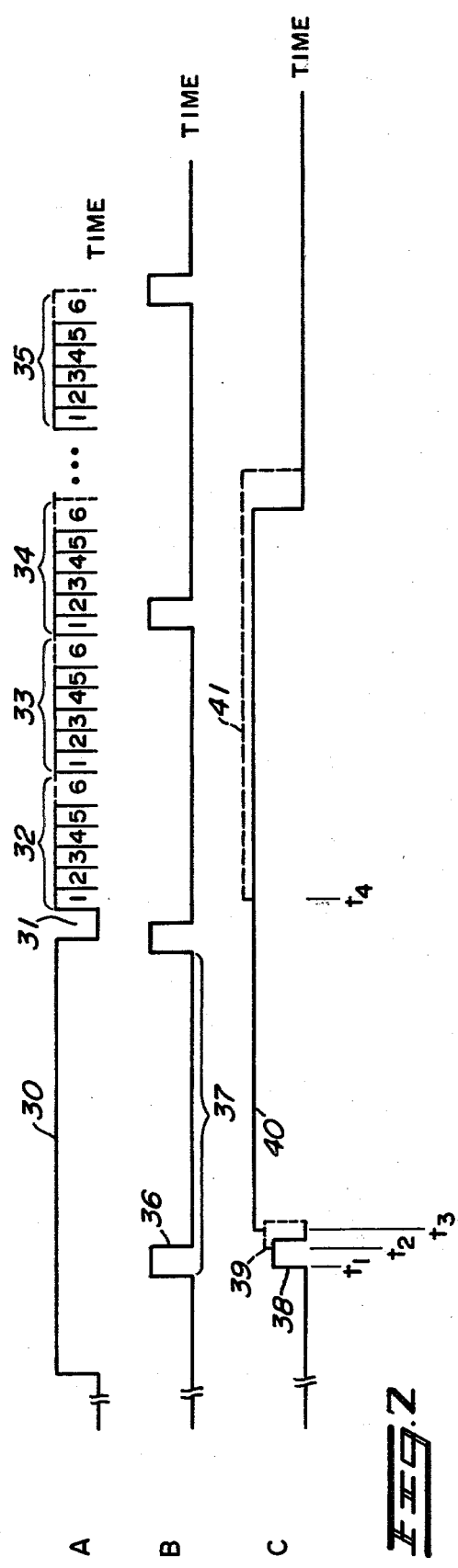
FIG. 2A is a graph representing a number of tone coded messages proceeded by a tone coded preamble.
FIG. 2B is a graph representing power which is periodically supplied to a receiver.
FIG. 2C is a graph representing power which is supplied to a receiver in response to the sequential detection of predetermined tones.
FIG. 2D is a chart of the typical time values for the wave forms shown in FIGS. 2A–2C.
Figure 2D:

A chart of the typical time durations for the referenced pulses depicted in FIGS. 2A–C is tabulated in FIG. 2D. From this chart it can be seen that the preamble tone 30 exists for a substantially longer time than any of the subsequent messages, such as 32, 33, or 34. The wave forms as shown in FIGS. 2B and 2C are representative of the output or operating power as supplied by power supply apparatus 15, the duration of which are effectively controlled by the control circuit 16. The multi-timer 18 produces timing pulses which are used to generate these wave forms.

Considering FIGS. 1 and 2 together, the general system operation of the battery saver circuit 10 can now be explained in detail. The typical time duration values indicated in FIGS. 1B and 2D are used for the following explanation illustrating the reception of a typical code which includes a preamble tone and five subsequent message tones.

The control circuit 16 uses the 52 ms (millisecond) pulse and the 512 ms pulse created by multi-timer 18 to generate the wave form in FIG. 2B. When the multi-timer 18 receives a reset pulse on line O, the battery saver control 23 is turned on by a pulse on line M and it remains on until a reset pulse on line N is produced by the timer control circuit 21 in response to the multi-timer 18 producing a pulse on line F after 52 ms. If no detection has occurred within this 52 ms period, the battery saver 23 will be turned off and the multi-timer 18 will generate another pulse after 512 ms on line G which will cause the timer control logic 21 to generate a reset pulse on line O. Thus power is supplied to the receiver 12 and tone filter 14 for 52 ms out of every 512 ms.

The 12 ms pulse (FIG. 1B) on line B (FIG. 1A) is used to create a corresponding 12 ms De-Q signal on line L, which shorts the detector part of filter 14 for 12 ms after a reset signal occurs on line O. This De-Q pulse is used to minimize the possibility of power-up transients causing a false detect signal on line K. The De-Q signal on line L shorts the stored up charge on a capacitor to insure that the detector portion of filter 14 starts from a zero initial condition. This detector portion has a normal response time of 15 ms before a detect signal is generated on line K. Therefore a modulating tone must be present at terminal 13 for 15 ms after the De-Q signal has terminated before a detect signal will be produced. The frequency which will produce a first detect signal is determined by the control circuit 16 through select signals received by the filter 14 on lines T-P through T-6. This first frequency is periodically searched for in a 40 ms period (52 ms minus 12 ms) every 512 ms, and this searching continues until a detection occurs within one of these 40 ms periods.

When a first preamble detection occurs, the detection processor 19 produces a signal on line Q that is coupled to the detect counter 20 and timer control logic 21. This detect signal causes multi-timer 18 to be reset and counter 20 to be indexed to a count of one. The multi-timer 18 is always reset after every detection unless an alert signal is being generated. The count of the number of detections, which is indicated on lines S, T, and U, is monitored by the detection processor 19 and the timer control logic 21. Since the multi-timer 18 was reset before the 52 ms pulse on line F occurred, the power supplied to the receiver 12 and filter 14 will continue until a reset pulse is received by the battery saver control 23 on line N. Since the detect counter 20 now has a count of one, a pulse on line N will not be created when the 52 ms pulse of line F occurs, but when the 42.5 ms pulse of line D occurs. This pulse selection is accomplished by the timer control logic circuit 21 through the use of OR gates as will be more fully explained subsequently. When the multi-timer 18 is reset, a De-Q signal is created on line L which terminates 2 ms after the reset pulse on line O. The selection of the 2 ms pulse instead of the 12 ms pulse for the De-Q period is similarly accomplished by OR gate logic in the detection processor 19 which also monitors the count of the detect counter 20. Thus power is extended to receiver 12 and filter 14 for 42.5 ms, and a search window of 40.5 ms is provided for the filter 14 to again search for the preamble tone.

When the preamble tone is detected for a second time by filter 14, an identical sequence of events occurs and the filter remains set to detect the preamble tone for a third time. When the preamble has been detected for a third time, a preamble detect latch in the timer control logic circuit 21 creates a positive logic signal on preamble detect line Z, which in turn trips a latch in the detect counter 20 that creates a high logic signal on line V which indicates the detection of a valid preamble.

After this third preamble detection, the timer control logic 21 selects the timing pulse on line I as the pulse which will reset the battery saver control 23 by causing a pulse on line N. Thus once a valid preamble has been detected, all radio pager receivers which have this preamble tone as the first tone in their sequential code will be turned on for a period of time corresponding to pulse 40 in FIG. 2C. Therefore a receiver having a preamble tone 30 as its first tone will be turned on if this tone was selected by the filter 14 in response to the select signals on lines T-P through T-6, and this tone was detected three consecutive times.

One advantage of the present invention is that by requiring several detections of the preamble tone, a valid preamble is only detected when the preamble tone exists for a duration of time substantially longer than any of the subsequent code tones. Thus in the present example the preamble 30 must exist for a minimum of 49 ms before a valid preamble is detected. The figure of 49 ms is obtained by multiplying the 15 ms response time of the filter 14 by three and adding two of the 2 ms delays caused by the De-Q signals on line L. Therefore in the present system, it is impossible to mistake an individual message tone, such as 32-2, for a preamble tone. The multiple sampling of the preamble also improves the noise immunity of the disclosed battery saver.

Once a valid preamble has been detected, the detect counter and tone detector control 20 supplies different select signals to filter 14 along lines T-P through T-6 for selecting the second predetermined frequency of the code. This second code tone corresponds to the first tone of one of the messages that follow the preamble, such as 32-1. The time duration of pulse 40 is sufficient to keep the receiver and filter on throughout the remainder of the preamble 30 and for an additional time which is long enough to interrogate the first two messages that follow the preamble. If no tone detection occurs during this initial time period (ITP), the multi-timer 18 will receive a reset signal on line O when the timing pulse on line I occurs and the preamble latch in the detect counter 20 will be reset. This results in the renewal of the periodic searching for the preamble tone.

The occurrence of a detection during the initial time period will effectively terminate the power supply pulse 40 and initiate a maintenance time period (MTP), as illustrated by pulse 41 in FIG. 2C. This maintenance time period keeps the power on long enough (681 ms) for the first tone of two additional messages to be interrogated. The detect counter 20 is indexed by the detection of this second tone and select signals are generated to search for the third code tone. The detection processor 19 and the timer control logic 21 use the timing pulses on lines C and E to create a time "window" which occurs between 21 ms and 45 ms after the detection of the second tone. If the third tone is detected within this time window, the multi-timer 18 will be reset, new select signals will cause filter 14 to respond to the fourth code tone, and an identical time window will be generated for this fourth tone. If a detection occurs before the window opens (before 21 ms), or if no detection occurs before the window closes (before 45 ms has elapsed), the tone filter 14 is reset to search for the second code tone. The procedure for detecting the fourth, fifth and sixth code tones is identical to that of detecting the third tone, and the second tone is always searched for whenever a subsequent tone is not detected within its time window. After the sixth tone is detected, the receiver will emit an alert signal signifying a reception of a coded message and the periodic sampling for the preamble tone is reinitiated.

By searching for the second code tone whenever a subsequent tone is not detected within a predetermined time window, a series of individual messages can be arranged as shown in FIG. 2A to alert a number of individual receivers. A principal advantage of the coding illustrated in FIG. 2A is that each individual message does not have to be immediately preceded by the preamble tone of the code.

It is contemplated by the present invention that a transmitter will receive a number of paging code inputs within a predetermined time period and correlate these inputs into groups, each group commencing with a single preamble tone followed by a string of messages each having a common first message tone. Subsequently all the messages in any one group will then be transmitted after the group preamble tone is transmitted. Thus when the messages 32, 33, 34 and 35 in FIG. 2A have an identical first message tone in addition to an identical common preamble tone 30, four paging receivers having corresponding codes will generate an alert signal when the paging group in FIG. 2A is transmitted.

In the preferred embodiment of the present invention, 10 unique tones are used for creating a six tone predetermined code for a number of pagers. For any one preamble tone, only 10% of the pagers will be activated. Of this subgroup, substantially only 10% of the individual pagers will have power applied to their receiver and filter throughout the broadcast time of any string of messages, since a second code tone detection must occur within the 1.146 seconds of pulse I after the preamble detection in order to keep the receiver on.

The blank gap 31 is required to prevent a receiver from falsely identifying the remaining portion of the preamble tone as a subsequent message tone and thereby falsely generating an alert signal. The gap 31 will create an absence of a signal during a subsequent time window and thus prevents the receiver from falsely receiving its entire tone code. The above described system will also function properly if the first tones of the subsequent messages are alternated. Thus a workable system is also provided if the tone 32-1 is different from the tone 33-1, but identical to tone 34-1. This is because the initial time period and the maintenance time period are sufficiently long to cover the first message tones of two subsequent messages.

A gap or unique tone is provided in the sixth message space (such as 32-6) to insure that an individual receiver does not mistakenly identify its code by starting with a tone other than a first message tone that follows the preamble. This unique sixth message tone is also used to select which one of several alert signals should be generated after the correct pager code has been identified.

Basically the invention involves initially alerting all receivers which have a common preamble tone in their individual code which corresponds to the transmitted preamble tone. Then the second code tone is searched for, and after identifying this tone, a third tone is searched for within a predetermined time window after the second tone has been detected. Every time a second or subsequent tone detection does occur, another window is generated and the next subsequent tone is searched for. When all of the code tones have been detected, an alert signal will be generated signifying the reception of a complete code.

An important aspect of the present invention is that whenever a subsequent tone is not detected within a predetermined time window, the receiver is reset to search for the second tone. Whenever this second tone is again detected, the sequence of time windows again commences and the entire code (minus the preamble tone) is therefore again searched for. By searching for the second tone rather than the first (preamble) tone whenever a proper detection does not occur, it is possible to condense the information being transmitted into a string of messages corresponding to the wave forms shown in FIG. 2A. Prior battery savers always reset the detector to redetect the initial or first tone. Thus in prior systems each individual message must be directly preceded by the preamble tone. This can be done only by transmitting a lengthy preamble tone before each message or by inserting a preamble tone before each one of the subsequent messages. Either of these alternatives will result in a sizeable increase in the broadcast time for the entire message string when a number of pager receivers are to be alerted. By increasing the total broadcast time, the battery drain on each individual receiver will also be increased. By the internal code sampling technique of the present invention, the battery drain on individual pager receivers is therefore substantially reduced.

The internal construction of the various block components illustrated in FIG. 1A, will now be discussed in detail.

The receiver 12 basically comprises standard radio receiver parts for receiving a modulated input signal and producing a demodulated output signal. Thus the internal parts of receiver 12 are well known in the art.

The switchable frequency tone filter and detector 14 may be of any suitable type, such as the one set forth and described in U.S. Pat. No. 3,803,429 to Wieczorek and Poorvin which is assigned to the same assignee as the present invention. In the referenced patent, a filter is illustrated which has its response frequency selected by the output of a counter. The select signals to filter 14 of the present invention are supplied through connecting lines T-P through T-6 which monitor the number of detection counts registered by the detect counter and tone detector control 20. The detector portion of tone filter 14 comprises a rectifier and RC network which produces a detect voltage on line K when a capacitor charge is above a minimum threshold value. The De-Quing of the filter 14 can be accomplished by placing a relay device across the detection capacitor, such that when a De-Q signal is present on line L the detection capacitor will be shorted out.

Control circuit 16 includes a number of individual block components each of which will now be described in detail. However, components 25 and 26 consist of a standard audio amplifier driving a loud speaker to amplify the alert signal generated when a complete code has been identified. Thus no further description of these components will be given.

The timer 18 consists basically of a plurality of flip-flop circuits and AND gates connected substantially as shown in FIG. 3. The clock 17 supplies a 4 kHz signal into the input of the plurality of flip-flop circuits which are arranged in a down counter configuration. The function of the flip-flops is to divide the frequency of the input signal, thus a 2 kHz output is derived by tapping off of the output of the first flip-flop. The reset terminals of flip-flops 3 through 17 are all connected to the reset input line O. The outputs of the various flip-flops are combined together to produce the various timing pulses on lines A through J which the multi-timer 18 is required to produce and which are identified in FIG. 1B. All of these pulses appear as repetitive logic level shifts which occur initially at a fixed amount of time after a counter reset pulse has been received on line O.

The output pulse D, for example, occurs 42.5 ms after the receipt of a reset pulse on line O. The D pulse is produced by the output of an AND gate 50 which has inputs from the second and fourth flip-flops and an AND gate 51 having inputs from the sixth and eighth flip-flops. The flip-flops can generally be analyzed by assuming that they count only positive transitions of an input signal. The output of the first flip-flop divides the frequency of the clock input signal and creates an output signal which has a level shift that occurs after every second pulse of the input signal. The output of the second flip-flop will therefore undergo a logic change after half a millisecond and the output of the third flip-flop will undergo a logic change after 1ms, etc. The AND gate 51 combines the positive output of the sixth flip-flop, which goes high after 8 ms, with the positive output of the eighth flip-flop, which goes high after 32 ms, to create an output signal which goes low 40 ms after a reset pulse on line O. This low 40 ms pulse is then combined with a low 2 ms pulse from the output of the fourth flip-flop and a low half millisecond pulse from the output of the second flip-flop. Since the outputs of all the flip-flops are repetitive, these three input signals will coincide and produce a signal on line D at 42.5 ms. The various other timing pulses are produced in an analogous way by combining other flip-flop output signals. Thus all the timing pulses on lines A through J are generated by the multi-timer 18 which also generates a 2 kHz signal that is coupled to the alert logic circuit 24.

Figure 4:
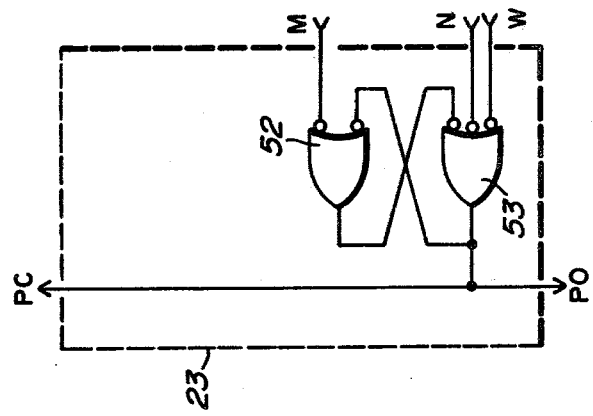
FIG. 4 is a schematic diagram of another one of the component blocks shown in FIG. 1A.

In FIG. 4, a schematic diagram of the battery saver control circuit 23 is illustrated. The circuit comprises two NOR gates 52 and 53 connected in a simple latch configuration. The battery saver control 23 supplies control signals to the power supply apparatus 15 on line PC which is coupled to the output of gate 53. These signals are either high or low logic states which are determined by the logic states present on input lines M, N, and W. The output signals produced by battery saver 23 are also monitored by the timer control logic circuit 21 through line PO.

When a high logic state is present on lines N and W, a low logic pulse on line M will result in the output of gate 53 going into a low logic state and being maintained there until a low logic input is received on lines N or W. Thus a signal input on line M serves to set a latch. This provides an output signal on line PC which will turn on power supply apparatus 15. The apparatus 15 will continue to supply power until the battery saver control 23 is reset by a low logic pulse on either line N or W. A low logic pulse on line W is created when an entire correct code is received, as will be described in detail later on. Thus the power to the receiver 12 and filter 14 is turned off after a sequential code has been correctly identified. The set and reset signals present on lines M and N are created by the timer control logic 21 in a manner to be subsequently described. The set signals on line M are created generally in response to the 512 ms pulse on line G and the reset pulses on line N are created generally in response to the timing pulses on lines D, F, H, and I.

Figure 5:
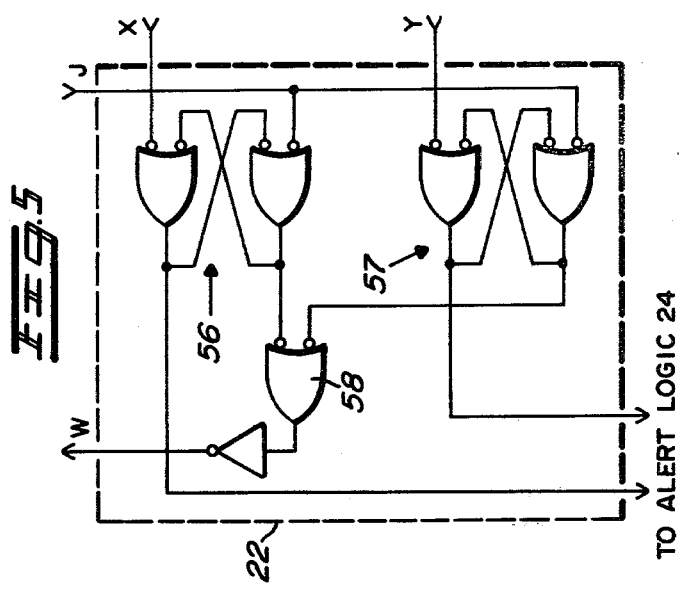
FIG. 5 is a schematic diagram of still another one of the component blocks illustrated in FIG. 1A.

In FIG. 5, a schematic diagram of the message memory circuit 22 is illustrated. This circuit receives an input on line X when a correct preamble followed by a correct five tone sequential message has been received. If an additional sixth unique tone is detected following the reception of the correct five tone message, then a signal input is created on line Y instead of line X. Each of these inputs trips a separate associated latch circuit generally designated as 56 and 57 and connected substantially as shown in the drawing. Each latch circuit produces an output signal which is coupled to the alerting logic circuit 24, and each latch also produces an output signal coupled to a NOR gate 58 that produces a signal on line W which indicates that a correct message has been received. The latches 56 and 57 are automatically reset in response to receipt of the 8.2 second pulse present on line J. Thus circuit 22 produces outputs which indicate which of two separate signals has been received, either a correct five tone or six tone message following a correct tone preamble, and it also produces a signal on line W indicating that a complete message has been received by the pager.

The alerting logic circuit 24 merely receives the output signals of latches 56 and 57 and combines them with a 2 kHz signal to produce two different alerts depending upon which of these latches has been triggered. Thus the internal circuitry of alerting logic 24 can consist of any combination of logic gates which will control the 2 kHz frequency of the multi-timer 18 to produce two separate output alert signals. These signals are coupled to the amplifier 25 and loud speaker 26 to create two separate alert signals in response to whether a correct five or a six tone message has been received after a correct preamble has been identified. Since the logic gates 56 and 57 are reset by the pulse on line J, the output signal produced by alert logic circuit 24 will last for 8.2 seconds. The internal configuration of logic circuit 24 consists of any combinational logic network that will produce two separate output alert signals in response to two separate input signals. Many types of combinational logic circuits that are well known in the prior art can be used to produce such a result, such as gating the two inputs and using a flip-flop to produce a 2 kHz or 1 kHz alert signal depending on whether a sixth message tone is received.

Referring to FIG. 6, the detect counter and tone detector control circuit 20 illustrated. The detect counter registers the number of true detect pulses received on a line Q. It is both advanced and reset by the detection processor 19, in conjunction with the timer control logic circuit 21, producing signals on lines Q and R, respectively. The binary count outputs S, T, and U of the detect counter 20 are monitored by the detection processor 19 and the timer control logic 21 to determine the proper timing for the next sequential detection and also to determine when a message has been completely received. Select signal outputs from the detect counter 20 are also coupled to the switchable frequency tone filter 14 on lines T-P through T-6 to control the frequency to which the switchable filter will respond to. As the detect counter is advanced, the lines T-P through T-6 will present different tone select signals to the tone filter 14.

The detect counter 20 includes a preamble latch generally designated as 60 which is tripped when an input on line Z from the timer control circuit 21 indicates that three detections of the preamble tone have occurred. Functionally, the detect counter 20 consists basically of a preamble counter which counts three detections of the preamble, and a message counter which counts the detections of message tones that follow the preamble. The detections that are received by the counter 20 on line Q represent valid detections that have already been gated with proper timing sequences by combinational logic contained in the timer control logic circuit 21 and the detection processor 19. Only correct detections are coupled to the detect counter 20 on line Q.

The detect counter 20 basically comprises preamble latch 60, flip-flop circuits 61 and 62, latch circuit 63 and six AND gates designated as 64 through 69, all of which are connected substantially as shown in FIG. 6. When a reset pulse is received on line R, the flip-flops 61 and 62, as well as latch 63, are reset. Subsequently, any detect pulse on line Q will result in flip-flops 61 and 62 initiating a binary count. A first detect pulse on line Q creates a positive logic state on line U. The second detect signal creates a positive logic state on line T and a zero logic state on line U. After a third detect signal, both lines T and U will have a positive logic state. If these three detections occur before a preamble has been detected, a low logic state will be created on line Z by the circuits 19 and 21. This will trigger the preamble latch 60 and create a high logic state on line V which indicates that a valid preamble has been detected. This also results in a reset pulse being generated on line R to zero out the counter.

The preamble detect signal on line V is used by the timer control logic 21 and detection processor 19 to change the timing sequences used in searching for the next tone detection and thus the next logic pulse on line Q. The preamble detect signal V is also used to change the logic state on line T-P and index the tone filter 14 to respond to the second tone (first message tone) of the sequential code of the pager.

Before the preamble was detected and a high logic state was created on line V, line T-P had a high logic state and lines T-1 through T-6 had low logic states. This combination of logic states on lines T-P through T-6 selects a tone frequency corresponding to a particular preamble tone. Once this preamble tone has been detected, the logic state on line V goes high and the detect counter is reset by a logic pulse on line R. This results in T-P having a low logic state and T-1 being switched into a high logic state, while lines T-2 through T-6 remain in low logic states. This combination of logic inputs to tone filter 14 selects the frequency of the second code tone (first message tone) which is to be detected. When this second tone is detected, a pulse is created on line Q and line U is switched into a high logic state. This switching will return line T-1 to a low logic state and switch line T-2 into a high logic state. This selects the third sequential frequency that tone filter 14 will respond to.

As long as proper detections occur, additional detect pulses will be created on line Q and this will result in the indexing of a high logic state from line T-3 through T-6. The latch circuit 63 is used instead of a third flip-flop circuit, but performs essentially the same counting function.

Whenever a third or subsequent sequential tone is not properly detected, a detect signal is not created on line Q and a reset signal is produced on line R by the timer control circuit 21 and the detection processor 19. Therefore when no detection occurs within a proper predetermined time window after a previous detection, or when a detection occurs before the predetermined time window begins, the tone filter 14 is reprogrammed to respond to the second sequential tone (first message tone) by resetting the detect counter 20.

A high logic state on line T-6 indicates that the preamble and five correct sequential message tones have been already detected. The high logic state on T-6 then programs the switchable tone filter 14 to search for either a blank space or a unique sixth tone. The logic output on line T-6 is then used by the detection processor 19, in conjunction with any detect signal subsequently received on line K, to determine whether a high logic state will be produced on line X or on line Y. This will indicate the type of sequential tone code message that has been received by the pager. Therefore a dual alert capability is provided which depends upon whether an extra tone is received after the entire code has been identified.

Figure 7B:
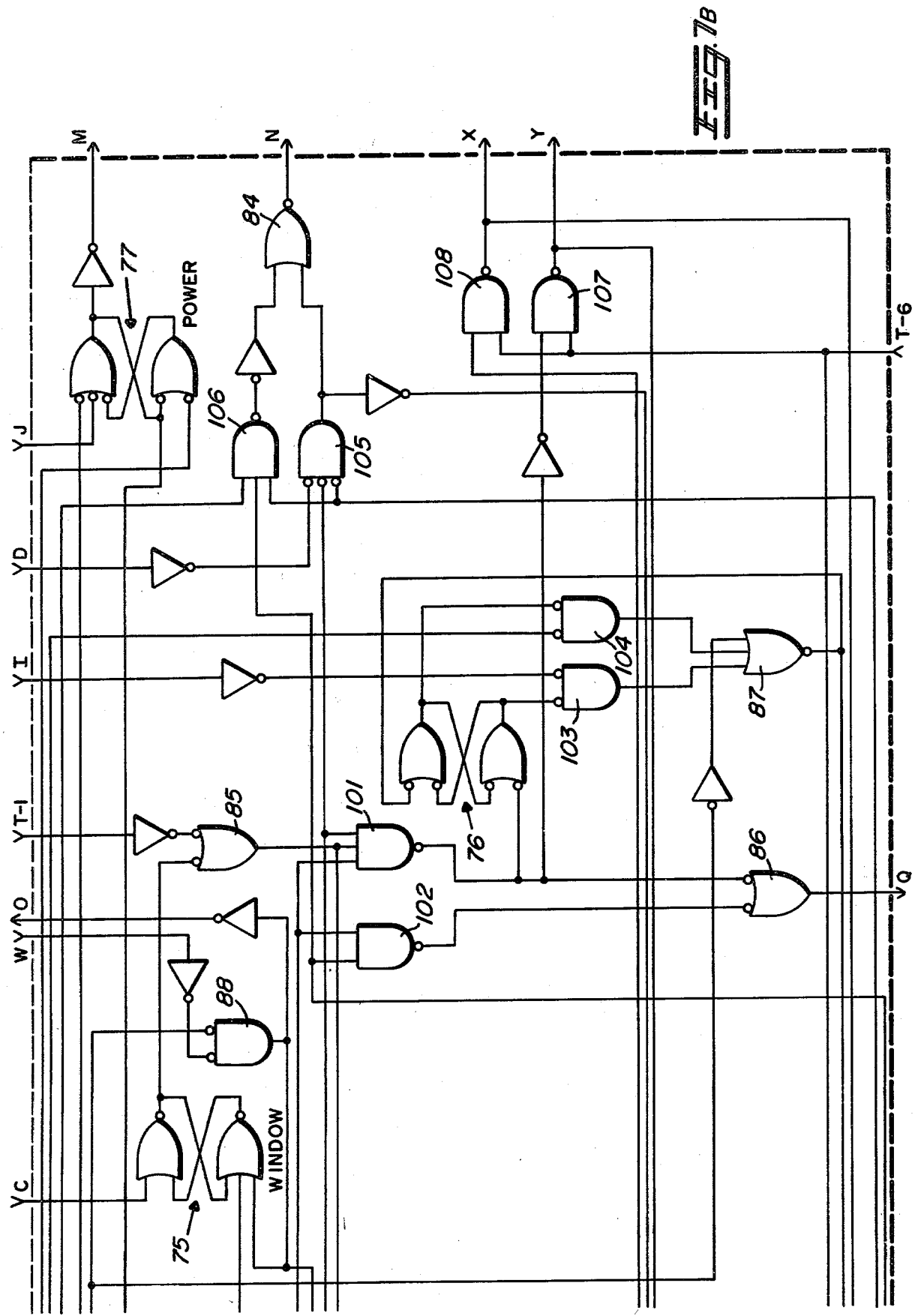
FIG. 7, shown on separate pages as FIG. 7A and FIG. 7B, is a combined schematic diagram of two of the component blocks illustrated in FIG. 1A.

FIG. 7, which consists of FIG. 7A having its open end joined to the open end of FIG. 7B, is a combined schematic diagram of the detection processor 19 and the timer control logic circuit 21. These two components were combined in a single diagram because of the interrelationship between the logic states developed by each of them. The functions of the timer control logic 21 and the detection processor 19 will now be explained in detail without reference to any internal circuitry and then the actual circuitry which accomplishes these functions will be discussed.

The detection processor 19 accepts detect pulses on line K from the switchable frequency tone filter 14 and checks these pulses against timing pulses supplied from the multi-timer 18. If these incoming detect pulses occur at correct times, as determined by the timer control logic circuit 21, the detection processor sends a signal to the detect counter 20 and the timer control logic 21 on line Q. If the incoming pulse is not correct in timing, a recount signal is sent to the detect counter 20 on line R which zeros the count. In either case, the detection processor 19 sends a De-Q signal on line L to the switchable filter 14 to zero the detector portion of the filter and prepare it for the next sequential tone. A reset signal is also sent to the multi-timer 18 on line O by the timer control logic 21 whenever a detection of a predetermined tone is made. The detection processor 19 monitors the outputs of the detect counter 20, which are the logic states on lines S, T, U, V, T-1, and T-6. The processor 19 sends an appropriate signal, on line X or Y, to the message memory circuit 22 when a specified number of true detections have occurred and a complete message has been received. The timer control logic circuit 21 is a combination of logic gates which control the multi-timer 18, the battery saver control 23, and certain sections of the detection processor 19 and detect counter 20. It receives signals from the multi-timer, the detection processor, the detect counter, and the message memory circuit 22, and thereby keeps track of all past and present occurrences. The timer control logic circuit 21 and the detection processor 19 are the logical heart of the battery saver circuit 10. They create the control signals that result in power being supplied to the receiver 12 and filter 14 and also they control the select signals generated by the detect counter 20. Together they also create timing windows, which are used in gating the detect pulses received on line K, by selecting timing pulses from the multi-timer 18 in accordance with the logical outputs of the detect counter 20.

The detection processor 19 and the timer control logic circuit 21 basically comprise eight latch circuits 70–77, 10 OR type circuits 78–87, 21 AND type circuits 88–108, and a number of inverter circuits which are connected substantially as shown in FIG. 7. The operation of the detection processor and timer control logic circuit will now be explained in detail with reference to the specific circuit elements that are utilized in detecting an entire sequential tone code.

Before a preamble tone is received, logic signals on lines M and N are created by the timer control logic 21 to control the power supply 15 and periodically generate a power supply wave form similar to that shown in FIG. 2B. The AND gate 100 receives a pulse on line G which occurs every 512 ms after the multi-timer 18 is reset by a pulse on line O. The other inputs to AND gate 100 are derived from line PO (which is high whenever power is not being supplied) and on another line which is high whenever a low logic state is present on line V (which indicates that a preamble has not been detected). Thus gate 100 produces a low output signal every 512 ms after a reset pulse is generated on line O. This output signal causes power latch 77 to be set, which in turn creates a low logic state on line M that eventually causes the power supply apparatus 15 to supply power to the receiver 12 and the tone filter 14.

The output of AND gate 100 also causes OR gate 79 to create a high output logic state which triggers OR gates 80 and 81. OR gate 80 then trips reset latch 73 which subsequently trips AND gate 88 (when no alert is indicated on line W) and creates a reset pulse on line O. The pulse on line O must be slightly delayed from the time at which the pulse on line G occurs in order for the circuit to function properly. This delay is normally obtained by gating the output of latch 73 with a delayed clock pulse produced by the multi-timer 18. These delay gating connections have not been shown in FIG. 7 in an effort to maintain the clarity of the figure. The delay gating can be obtained by any AND gate connection of the output of latch 73 and a sequential clock pulse that occurs a small but finite time after pulse G has been created. In practice these pulses may be obtained from the first few flip-flops of the multi-timer 18.

A pulse occurs on line F 52 ms after the multi-timer is reset and this pulse is received as an input by AND gate 106. This gate has two other inputs, one of which is always high before a valid preamble has been detected (high when V is in a low logic state), and the other of which is always high when the detect counter 20 outputs S, T, and U (monitored by AND gate 91) are all low. Thus AND gate 106 creates a low output pulse 52 ms after a reset pulse on line O is received by the multititimer and a valid preamble has not been detected and the detect counter 20 has a zero detection count. The output of AND gate 106 is coupled through OR gate 84 and results in a low pulse generated on line N after 52 ms. This low pulse on line N causes the power to the receiver 12 and filter 14 to be shut off for the remainder of the 512 ms period.

When power latch 77 is triggered by the 512 ms pulse on line G, this results in De-Q latch 71 being set which creates a De-Q pulse on line L which will zero out the detector portion of the tone filter 14. This De-Q pulse is terminated by the pulse on line B which resets De-Q latch 71 12 ms after a reset pulse on line O occurs. Thus the first 12 ms of the power on period is blanked out by the De-Q pulse and only the remaining 40 ms of the 52 ms period is left for the tone filter 14 to create a detect signal on line K.

When a detect signal is received on line K, the AND gate 89 will create a positive output which will set the detect latch 70. This results in the AND gate 102 developing a low logic output which is coupled to OR gate 86 to create a positive pulse on line Q that signifies a proper detection. The setting of the detect latch 70 also sets the reset latch 73 which results in a reset pulse being generated on line O. The positive pulse on line Q results in the detect counter 20 registering a count which disables the AND gate 106 and therefore prevents the developing of a power off signal in response to the 52 ms pulse on line F. The AND gate 105 will now control the generation of power off pulses on line N. The inputs to the AND gate 105 are the 42.5 ms pulse on line D in combination with any non-zero detection count by the detect counter 20 along with the fact that a valid preamble has not been detected yet. Thus after a first detection of a preamble tone has resulted in a resetting of the multi-timer 18, gate 105 effectively extends the power on period for 42.5 ms.

A 2 ms De-Q pulse is produced by having the 2 ms pulse on line A coupled through AND gate 95 which in turn resets the De-Q latch 71 which was set when the detect latch 70 was tripped by the first detect signal. The pulse on line A thus creates a De-Q pulse having a 2 ms duration which starts after a tone is detected. Therefore a 40.5 ms search window is provided for the tone filter 14, in which time a second preamble tone detection must occur. The logic states generated by a second detection of the preamble tone within this 40.5 ms window are essentially the same as the logic states generated by the first detection with the exception that the detect counter 20 is incremented by a count of one. However when a third detection of the preamble tone is made, the detect counter output lines T and U both have a high logic state and this results in AND gate 90 producing a low logic output that trips the latch 72 which results in a low logic pulse on line Z. This low logic pulse on line Z will trip the preamble latch 60 (shown in FIG. 6) and create a high logic state on line V which in turn selects the second code tone to be searched for (the first message tone). A high logic state on line V will disable AND gates 105 and 106, so that now a reset pulse on line N will not be generated by any timing pulse on line D or F.

When the third valid preamble detection occurred, a reset pulse on line O was generated in addition to the high logic state on line V. If a second code tone is not detected within 1.146 seconds after this reset pulse, the timing pulse on line I will combine with a low logic output from latch 76 and actuate the AND gate 103. The output of the AND gate 103 is coupled through OR gate 87 to produce a low logic output on line Reset₁ which in turn resets the preamble latch 60 in the detect counter 20. The output of OR gate 87 also initiates a reset pulse on line O through reset latch 73 and OR gates 79 and 80, and a recount pulse on line R through OR gates 79, 81, and 83. Thus if no detection occurs before the timing pulse on line I occurs, the battery saver circuit 10 is reset for the periodic sampling of the preamble tone and the periodic power supply wave form illustrated in FIG. 2B will again be generated.

When the second code tone is detected by the tone filter 14 before the timing pulse on line I occurs, the detect latch 70 is tripped which results in: (1) a reset pulse on line O being generated by the reset latch 73 being set and causing the AND gate 88 to produce a high logic output; (2) a 2 ms De-Q pulse being generated on line L caused by the setting of De-Q latch 71 and the resetting of this latch by the 2 ms timing pulse on line B; and (3) the setting of latch 76 caused by the actuation of AND gate 101 which has inputs from the detect latch 70, the preamble detect line V, and the select line T-1 through OR gate 85. When latch 76 has been set, AND gate 103 is rendered inoperative and AND gate 104 will now be rendered operative when the timing pulse on line H occurs. The detection of the second code tone also indexes the detect counter 20 and thereby selects the third code tone for detection by the tone filter 14. If no additional code tone is detected before the timing pulse on line H occurs, the AND gate 104 will be actuated. The actuation of AND gate 104, just like the actuation of gate 103, will result in actuating OR gate 87 and will therefore result in the recommencing of the periodic generation of power and preamble sampling. The actuation of gate 104 also will reset the latch 76. Therefore once a valid preamble has again been detected, the second code tone will again have to be detected within the time period bounded by the pulse on line I and then subsequent detections will again have to occur within the time period bounded by the pulse on line H.

The pulse on line C will set the window latch 75 21 ms after the second code tone has been detected. The pulse on line E will actuate AND gate 97 resulting in the resetting of the window latch 75 45 ms after the second tone has been detected. Thus latch 75 creates a time window which results in OR gate 85 having a positive logic output between 21 ms and 45 ms after the second tone detection. Therefore gate 101 can only be actuated by a third or subsequent code tone detect pulse on line K occurring within this time window. For a preamble tone detection gate 102 was used instead of gate 101 and for a second code tone detection gate 85 is activated by the pulse on line T-1 rather than the output of the window latch 75. If a detection is made within this time window, a positive logic state on line Q is created. This represents the detection of a sequential tone within its proper timing sequence and this results in the indexing of the detect counter 20 and the subsequent selection of the next tone in the predetermined code sequence.

The output of gate 82 prevents any detections from occurring after the 45 ms pulse on line E, by rendering AND gate 89 inoperative after this pulse occurs. The output of gate 82 generally indicates that the time window has expired and no detections have occurred. This will actuate AND gate 92 whenever a high logic state is present on any of lines S, T, or U. Gate 92 will cause latch 72 to be set and this will result in OR gate 81 being actuated and creating a recount signal on line R that results in the count of the detect counter 20 being set to zero. If a detection occurs before the window opens, AND gate 99 will be actuated and this will also result in a recount signal on line R. Thus whenever the third or any subsequent tone is not detected within the 21 to 45 ms window, the 45 ms pulse on line E will effectively cause the detect counter 20 to be reset. The resetting of the detect counter will reset the select signal lines T-P through T-6 so that the second code tone will be searched for. If a detection is made within a time window, the detect counter 20 is incremented by a count of one and the multi-timer 18 is reset. Therefore the pulse on line E will not occur so long as sequential detections within the time window are made.

The unlabled inputs to gate 94 represents merely extra timing pulses created by the multi-timer 18 which are used to insure the proper gating of the 2 ms De-Q pulse on line A through AND gate 95. The CP input to AND gate 96 is a delayed clock pulse which is used to reset the latch 73, a small but finite time after this latch has been set by the output of OR gate 80. Various other timing delay pulses created by the multi-timer 18 have not been illustrated in FIG. 7 for clarity, this includes a reset pulse to detect latch 70.

When all five sequential message tones, in addition to the preamble tone, have been identified by the battery saver circuit 10, a high logic state will exist on line T-6. This high logic state will inactivate AND gate 97 and cause AND gate 98 to respond to a pulse on line F. This creates a time window of 21 to 52 ms for the detection of a sixth unique message tone. When such a message tone is detected within this extended time window, AND gate 101 will again be actuated resulting in the actuation of AND gate 107 and the creation of a low logic state on output line Y. If this window expires without a detection of a sixth tone being made, the output of gate 82 will actuate AND gate 108 and create a low logic state on output line X. Thus line X indicates when a preamble tone followed by a sequential five tone code, not followed by a predetermined sixth unique tone, has been received by the inventive battery saver circuit. The output Y indicates when the preamble, the five tone message code, and the sixth unique tone have been received by the battery saver circuit.

The preamble tone and each of the five subsequent message tones comprising the code of a radio receiver may all be different frequencies or under some conditions the same frequency. For example, the preamble tone and the second and fourth message tones may have the same identical frequency whereas the first, third and fifth message tones may have different frequencies. The use of specific time durations in describing the operation of the preferred embodiment, does not in any way limit the scope of the present invention. While I have shown and described specific embodiments of this invention, further modifications and improvements will occur to those skilled in the art. All such modifications which retain the basic underlying principles disclosed and claimed herein are within the scope of this invention.

I claim:

1. An improved battery saver circuit for use with personalized radio apparatus operable on receipt of a predetermined sequential tone code having at least first, second, and third tones, said battery saver circuit comprising:
   receiver means for receiving tone modulated input signals and providing corresponding output tone signals in response thereto at a reference terminal;
   power supply means coupled to said receiver means for selectively supplying operating power thereto;
   detector means coupled to said receiver reference terminal for indicating a detection in response to said output tone signals having a predetermined frequency; and
   control means coupled to said power supply means and said detecting means for selectively controlling the same;
   said control means including,
   first circuit means for enabling said power supply means to periodically supply operating power to said receiver for a first predetermined time duration and for effecting the selection of a first frequency that said detector means will respond to,
   second circuit means for enabling said power supply means to supply operating power for a second predetermined time duration in response to said first frequency being detected during said first time duration,
   third circuit means for enabling said power supply means to supply operating power for a third predetermined time duration and effecting the selection of a second frequency in response to said first frequency being detected during said second time duration,
   fourth circuit means for enabling said power supply means to supply operating power for a fourth predetermined time duration and effecting the selection of a third frequency in response to said second frequency being detected, and
   fifth circuit means for effecting the selection of said second frequency in response to said third frequency not being detected within a predetermined time window after said second frequency has been detected.

2. An improved battery saver circuit for use with personalized radio apparatus operable on receipt of a predetermined sequential tone code having at least first and second tones, said battery saver circuit comprising:
   receiver means for receiving tone modulated input signals and providing corresponding output tone signals in response thereto at a reference terminal;
   power supply means coupled to said receiver means for selectively supplying operating power thereto;
   detector means coupled to said receiver reference terminal for indicating a detection in response to said output tone signals having a predetermined frequency; and
   control means coupled to said power supply means and said detecting means for selectively controlling the same;
   said control means including,
   first circuit means for enabling said power supply means to periodically supply operating power to said receiver for a first predetermined time duration and for effecting the selection of a first frequency that said detector means will respond to,
   second circuit means for enabling said power supply means to supply operating power for a second predetermined time duration in response to said first frequency being detected during said first time duration, and
   third circuit means for enabling said power supply means to supply operating power for a third predetermined time duration and effecting the selection of a second frequency in response to said first frequency being detected during said second time duration.

3. An improved battery saver circuit according to claim 2 wherein said receiver means is a radio receiver and said power supply means includes a battery.

4. An improved battery saver circuit according to claim 2 wherein said control means includes timing means for generating timing pulses.

5. An improved battery saver circuit according to claim 4 wherein said timing means includes a pulse generating clock and a down counter.

6. An improved battery saver circuit according to claim 5 wherein said control means includes a detect counter for counting the number of detections.

7. An improved battery saver circuit according to claim 6 wherein said control means includes alert means for producing an alert signal after all of the tones of the predetermined code are properly sequentially identified.

8. An improved battery saver circuit according to claim 7 wherein said control means includes circuit means for causing the power supplied to said receiver means to be cut off in response to said alert signal being generated.

9. An improved battery saver circuit for use with personalized radio apparatus operable on receipt of a predetermined sequential tone code having at least first, second, and third tones, said battery saver circuit comprising:

receiver means for receiving tone modulated input signals and providing corresponding output tone signals in response thereto at a reference terminal;

power supply means coupled to said receiver means for selectively supplying operating power thereto;

detector means coupled to said receiver reference terminal for indicating a detection in response to said output tones having a predetermined frequency; and control means coupled to said power supply means and said detecting means for selectively controlling the same;

said control means including, first circuit means for enabling said power supply means to periodically supply operating power to said receiver for a first predetermined time duration and for effecting the selection of a first frequency that said detector means will respond to, second circuit means for enabling said power means to supply operating power for a second predetermined time duration and effecting the selection of a second frequency in response to said first frequency being detected, third circuit means for enabling said power means to supply operating power for a third predetermined time duration and effecting the selection of a third frequency in response to said second frequency being detected, and fourth circuit means for effecting the selection of said second frequency in response to said third frequency not being detected within a predetermined time window after said second frequency has been detected.

10. An improved battery saver circuit for use with personalized radio apparatus operable on receipt of a predetermined sequential tone code having at least first and second tones, said battery saver circuit comprising:

receiver means for receiving tone modulated input signals and providing corresponding output tone signals in response thereto at a reference terminal;

power supply means coupled to said receiver means for selectively supplying operating power thereto;

detector means coupled to said receiver reference terminal for indicating a detection in response to said output tone signals having a predetermined frequency; and control means coupled to said power supply means and said detecting means for selectively controlling the same;

said control means including, first circuit means for enabling said power supply means to periodically supply operating power to said receiver for a first predetermined time duration and for effecting the selection of a first frequency that said detector means will respond to, second circuit means for enabling said power supply means to supply operating power for a second predetermined time duration and effecting the selection of a second frequency in response to said first frequency being detected and said output tone signals having said first frequency for at least a first detect time duration, and third circuit means for generating an alert signal in response to said second frequency being detected and said output tone signals having said second frequency for at least a second detect time duration, said first detect time duration being greater than said second detect time duration.

11. A multiple alert receiver operable in response to receiving a predetermined tone code, said receiver comprising:

receiver means for receiving transmitted signals;

detector means coupled to said receiver means for indicating a detection in response to a predetermined code being received by said receiver means; and alert means coupled to said receiver means and said detector means for selecting and generating at least one of several alert signals in response to said detector means indicating a code detection and an additional signal being received by said receiver means, the additional received signal determining which of said several alert signals will be generated;

wherein the predetermined code includes at least one tone and said detector means includes circuitry for searching for said tone within a first time window duration and wherein said alert means includes circuitry for searching for said additional signal within a second time window duration, occurring after the code detection, which is greater than said first time window duration, whereby the receiver will be more likely to select a correct alert signal after said predetermined code has been identified.

12. A multiple alert receiver according to claim 11 wherein said additional signal includes at least one tone.

13. An improved battery saver circuit for use with personalized radio apparatus operable on receipt of a predetermined sequential signal code having at least first and second predetermined code signals, said battery saver circuit comprising:

receiver means for receiving modulated input signals and providing corresponding output signals in response thereto at a reference terminal;

power supply means coupled to said receiver means for selectively supplying operating power thereto;

detector means coupled to said receiver reference terminal for indicating a detection in response to said output signals corresponding to predetermined code signals; and control means coupled to said power supply means and said detecting means for selectively controlling the same;

said control means including, first circuit means for enabling said power supply means to periodically supply operating power to said receiver means for a first predetermined time duration and for effecting the selection of a first predetermined code signal that said detector means will respond to, second circuit means for enabling said power supply means to supply operating power to said receiver means for a second time duration subsequent to and in response to said first predetermined code signal being detected during said first time duration, and third circuit means for effecting the selection of a second predetermined code signal subsequent to and in response to at least said first predetermined code signal being detected during said second time duration, whereby looking for said second predetermined code signal is accomplished only after multiply detecting said first predetermined code signal.

14. A battery saver circuit as claimed in claim 13 wherein said third circuit means includes circuitry for enabling said power supply means to supply operating power to said receiver means for a third time duration subsequent to and in response to at least said first code signal being detected during said second time duration, whereby said third time duration is at least long enough to permit detection of said second predetermined code signal and whereby providing power to said receiver means for detecting said second code signal is accomplished only after multiply detecting said first code signal.

15. A battery saver circuit as claimed in claim 14 wherein said control means includes fourth circuit means for supplying power to said receiver means for a fourth time duration subsequent to and in response to said second code signal being detected during said third time duration, whereby said fourth time duration is long enough to permit detection of a code signal following said second code signal.

16. A battery saver circuit as claimed in claim 15 wherein said predetermined code signals are tone signals having different frequencies and wherein said detector means comprises tone detector means for determining frequency correspondence.

17. An improved battery saver circuit for use with personalized radio apparatus operable on receipt of a predetermined sequential signal code having at least first, second, and third predetermined code signals, said battery saver circuit comprising:
  receiver means for receiving modulated input signals and providing corresponding output signals in response thereto at a reference terminal;
  power supply means coupled to said receiver means for selectively supplying operating power thereto;
  detector means coupled to said receiver reference terminal for indicating a detection in response to said output signals corresponding to predetermined code signals; and
  control means coupled to said power supply means and said detecting means for selectively controlling the same;
  said control means including,
  first circuit means for enabling said power supply means to periodically supply operating power to said receiver for a first predetermined time duration and for effecting the selection of a first predetermined code signal that said detector means will respond to,
  second circuit means for enabling said power means to supply operating power for a second predetermined time duration and effecting the selection of a second predetermined code signal in response to said first predetermined code signal being detected,
  third circuit means for enabling said power means to supply operating power for a third predetermined time duration and effecting the selection of a third predetermined code signal in response to said second predetermined code signal being detected, and
  fourth circuit means for effecting the selection of said second predetermined code signal in response to said third predetermined code signal not being detected within a predetermined time window after said second predetermined code signal has been detected.

18. An improved battery saver circuit for use with personalized radio apparatus operable on receipt of a predetermined sequential signal code having at least first and second predetermined code signals, said battery saver circuit comprising:
  receiver means for receiving modulated input signals and providing corresponding output signals in response thereto at a reference terminal;
  power supply means coupled to said receiver means for selectively supplying operating power thereto;
  detector means coupled to said receiver reference terminal for indicating a detection in response to said output signals corresponding to predetermined code signals; and
  control means coupled to said power supply means and said detecting means for selectively controlling the same;
  said control means including,
  first circuit means for enabling said power supply means to periodically supply operating power to said receiver means for a first predetermined time duration and for effecting the selection of a first predetermined code signal that said detector means will respond to,
  second circuit means for enabling said power supply means to supply operating power to said receiver means for a second time duration and effecting the selection of a second predetermined code signal subsequent and in response to said first predetermined code signal being detected and said output signals corresponding to said first predetermined code signal for at least a first detect time duration, and
  third circuit means for generating an alert signal in response to at least said second predetermined code signal being detected and said output signals corresponding to said second predetermined code signal for at least a second detect time duration,
  said first detect time duration being greater than said second detect time duration whereby applying power to said receiver means for looking for said second predetermined code signal occurs only after the detection of a first code signal substantially longer than said second code signal and whereby said second time duration is long enough to permit detection of said second code signal.

19. A battery saver circuit as claimed in claim 18 wherein said predetermined code signals are tone signals having different frequencies and wherein said detector means comprises a tone detector means for determining frequency correspondence.

20. A multiple alert receiver operable in response to receiving a predetermined signal code, said receiver comprising:
  receiver means for receiving transmitted signals;
  detector means coupled to said receiver means for indicating a detection in response to a predetermined signal code being received by said receiver means; and
  alert means coupled to said receiver means and said detector means for selecting and generating at least one of several alert signals in response to said detector means indicating a code detection and an additional signal being received by said receiver means, the additional received signal determining which of said several alert signals will be generated;
  wherein the predetermined code includes at least a first predetermined signal and said detector means includes circuitry for searching for said first predetermined signal within a first time window duration and wherein said alert means includes circuitry for searching for said additional signal within a second time window duration, occuring after the code detection which is greater than said first time window duration, whereby the receiver will be more likely to select a correct alert signal after said predetermined code has been identified.

21. A circuit for use with personalized radio apparatus operable on receipt of a predetermined sequential signal code having at least first and second predetermined code signals, said circuit comprising:
receiving means for receiving modulated input signals and providing corresponding output signals in response thereto at a reference terminal;
power supply means coupled to said receiver means for selectively supplying operating power thereto;
detector means coupled to said receiver reference terminal for indicating a detection in response to said output signals corresponding to predetermined code signals; and
control means coupled to said detecting means for selectively controlling the same;
said control means including,
first circuit means for effecting the selection of a first predetermined code signal that said detector means will respond to,
second circuit means for effecting the selection of a second predetermined code signal in response to said first predetermined code signal being detected and said output signals corresponding to said first predetermined code signal for at least a first detect time duration, and
third circuit means for generating an alert signal in response to said predetermined sequential signal code being detected and in response to said second predetermined code signal being detected and said output signals corresponding to said second predetermined code signal for at least a second detect time duration,
said first detect time duration being greater than said second detect time duration,
wherein said predetermined code signals are tone signals having different individual frequencies and wherein said second circuit means includes circuitry for selecting said second predetermined code signal after at least two detections of said first predetermined code signal by said detector means and
wherein said control means is coupled to said power supply means for selectively controlling the same and wherein said first circuit means enables said power supply means to periodically supply operating power to said receiver means for a first predetermined time duration, and wherein said second circuit means enables said power supply means to supply operating power to said receiver means for a second time duration subsequent to and in response to said first predetermined code signal being initially detected.

22. A circuit according to claim 21 wherein said second circuit means includes circuitry for enabling said power supply means to supply operating power to said receiver means for a third time duration subsequent to and in response to said first predetermined code signal being detected during said second time duration, whereby said third duration is at least long enough to detect said second code signal.

23. A circuit for use with personalized radio apparatus operable on receipt of a predetermined sequential signal code having at least first, second and third predetermined code signals, said circuit comprising:
receiver means for receiving modulated input signals and providing corresponding output signals in response thereto at a reference terminal;
power supply means coupled to said receiver means for selectively supplying operating power thereto;
detector means coupled to said receiver reference terminal for indicating a detection in response to said output signals corresponding to predetermined code signals; and
control means coupled to said detecting means for selectively controlling the same;
said control means including,
first circuit means for effecting the selection of a first predetermined code signal that said detector means will respond to,
second circuit means for effecting the selection of a second predetermined code signal in response to said first predetermined code signal being detected,
third circuit means for effecting the selection of a third predetermined code signal in response to said second predetermined code signal being detected, and
fourth circuit means for effecting the selection of said second predetermined code signal in response to said third predetermined code signal not being detected within a predetermined time window after said second predetermined code signal has been detected.

24. A circuit according to claim 23 wherein said control means is coupled to said power supply means for selectively controlling the same and wherein said first circuit means enables said power supply means to periodically supply operating power to said receiver means for a first predetermined time duration, and wherein said second circuit means enables said power supply means to supply operating power to said receiver means for a second predetermined time in response to said first predetermined code signal being detected.

25. A circuit according to claim 24 wherein said predetermined code signals are tone signals having different individual frequencies.

26. A battery saver circuit for use with personalized radio apparatus operable on receipt of a predetermined sequential tone code having at least first and second predetermined code signals, said battery saver circuit comprising:
receiver means for receiving tone modulated input signals and providing corresponding output tone signals in response thereto at a reference terminal;
power supply means coupled to said receiver means for selectively supplying operating power thereto;
detector means coupled to said receiver reference terminal for indicating a detection in response to said output tone signals having a predetermined frequency; and
control means coupled to said power supply means and said detecting means for selectively controlling the same;
said control means including,
first circuit means for enabling said power supply means to periodically supply operating power to said receiver means for a first predetermined time duration and for effecting the selection of a first frequency code signal that said detector means will respond to, second circuit means for enabling said power supply means to supply operating power to said receiver means for a second time duration subsequent to and in response to said first frequency code signal being detected during said first time duration and for supplying power to said receiver means for a third time duration subsequent to and in response to said first frequency code signal being detected during said second time duration, and third circuit means for enabling said power supply means to supply operating power to said receiver means for a fourth time duration and effecting the selection of a second frequency code signal subsequent to and in response to said first frequency code signal being detected during said third time duration, whereby said fourth time duration is at least long enough to permit detection of said second code signal and whereby power is supplied for said fourth time duration only after at least three detections of said first code signal.

27. A battery saver circuit as claimed in claim 26 wherein said second and third time durations are at most substantially the same duration as said first time duration and wherein said fourth time duration is substantially larger than said first time duration.

28. A battery saver circuit as claimed in claim 27 wherein said first time duration is 52 milliseconds, said second and third time durations are 42 milliseconds and said fourth time duration is 1.146 seconds.

29. A battery saver circuit as claimed in claim 26 in which said control means includes fourth circuit means for enabling said power supply means to supply operating power to said receiver means for a fifth time duration and effecting the selection of a third frequency code signal subsequent to and in response to said second frequency code signal being detected during said fourth time duration.

* * * * *

Disclaimer 4,181,893.—*Edward L. Ehmke*, Margate, Fla. BATTERY SAVER FOR A TONE CODED SIGNALLING SYSTEM. Patented dated Jan. 1, 1980. Disclaimer filed Aug. 28, 1981, by the assignee, *Motorola, Inc.*

Hereby enters this disclaimer to claims 10, 18 and 19 of said patent.

[*Official Gazette September 21, 1982.*]